June 14, 1938.  T. H. SCHOEPF ET AL  2,120,443
METHOD AND APPARATUS FOR BRAKING
Filed June 8, 1937  4 Sheets-Sheet 1

INVENTORS
THEODORE H. SCHOEPF
DAVID M. RITCHIE
BY Toulmin & Toulmin
ATTORNEYS

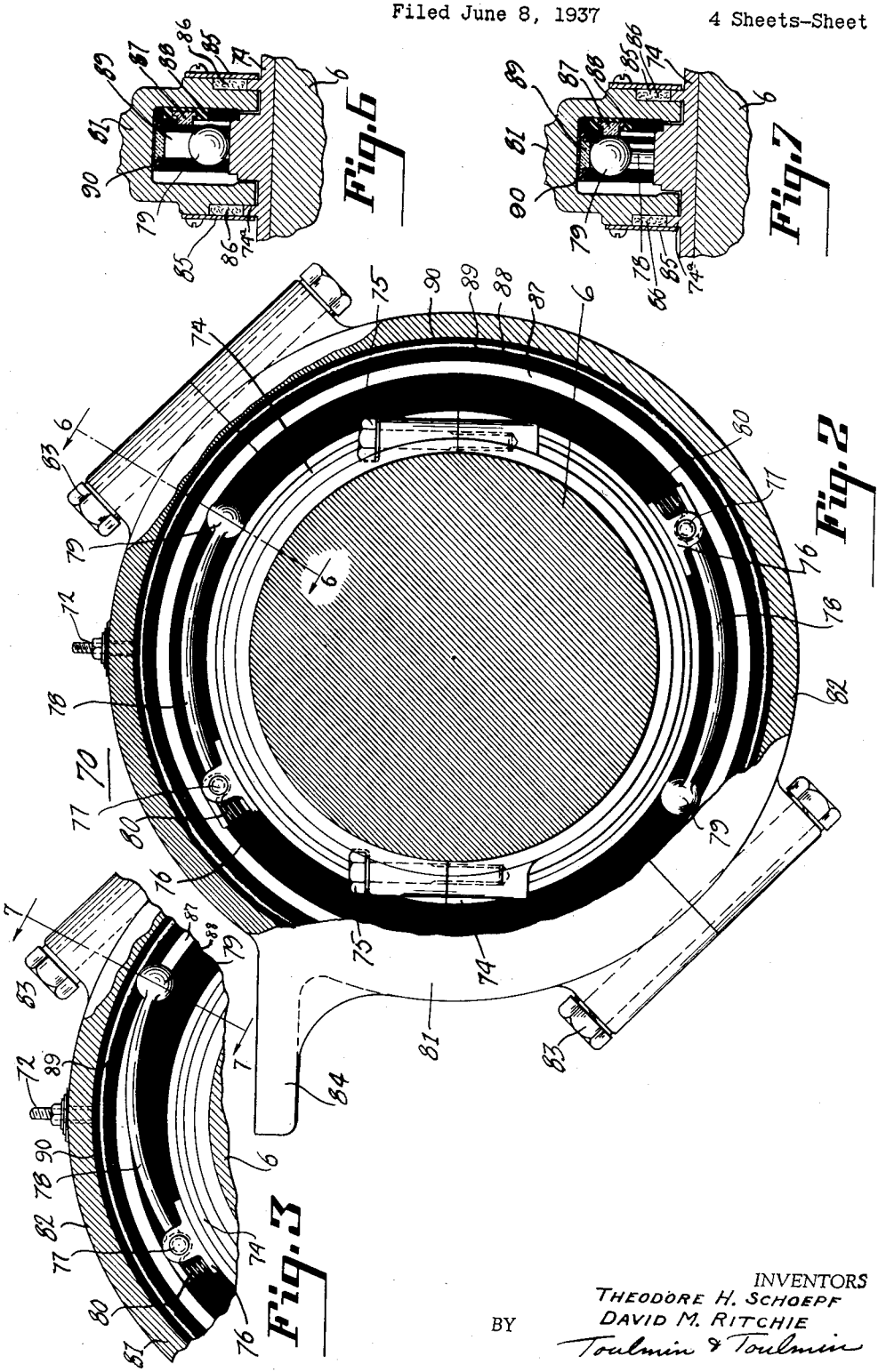

June 14, 1938.  T. H. SCHOEPF ET AL  2,120,443
METHOD AND APPARATUS FOR BRAKING
Filed June 8, 1937  4 Sheets-Sheet 3
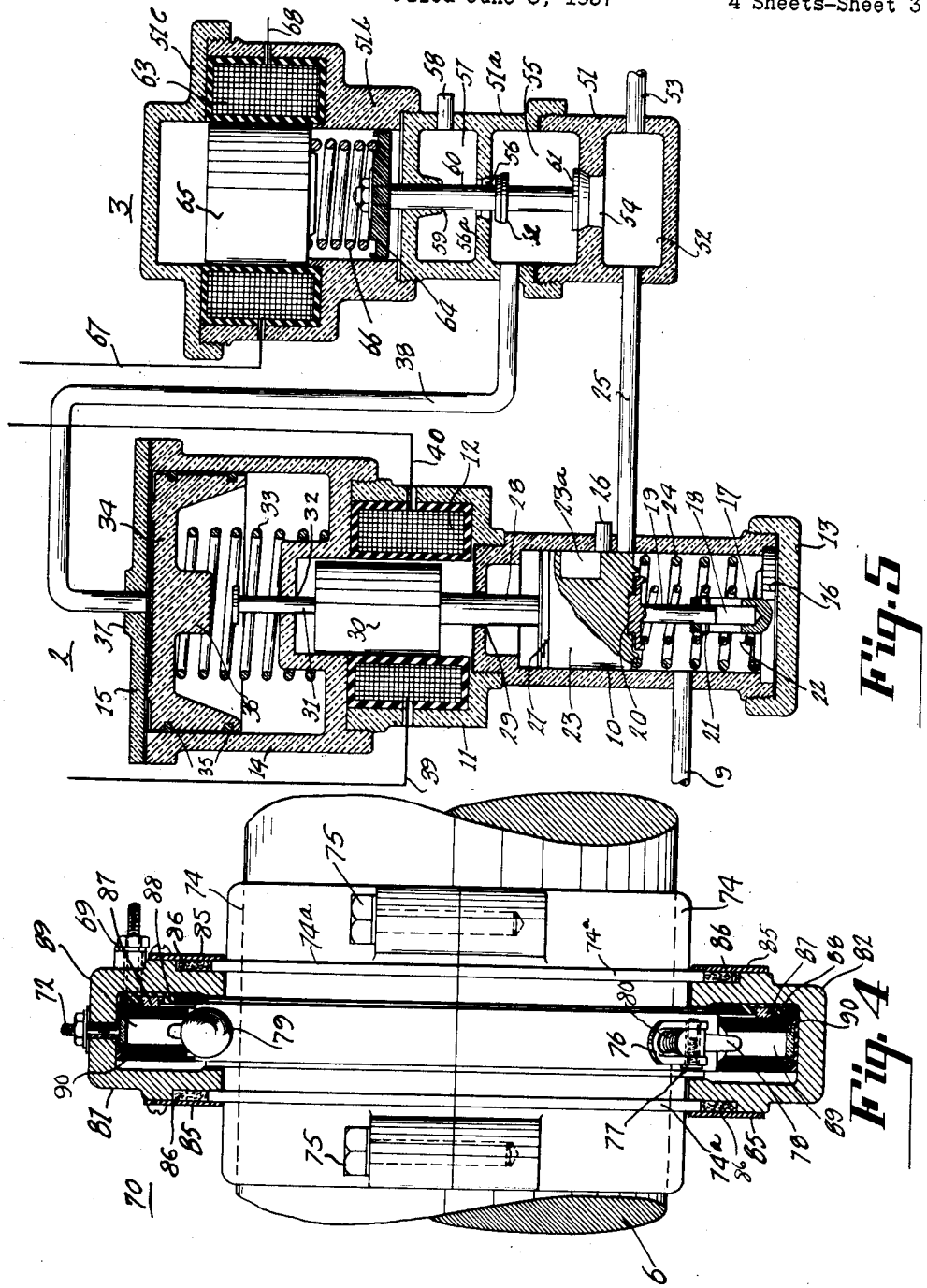
INVENTORS
THEODORE H. SCHOEPF
DAVID M. RITCHIE
BY
Toulmin & Toulmin
ATTORNEYS

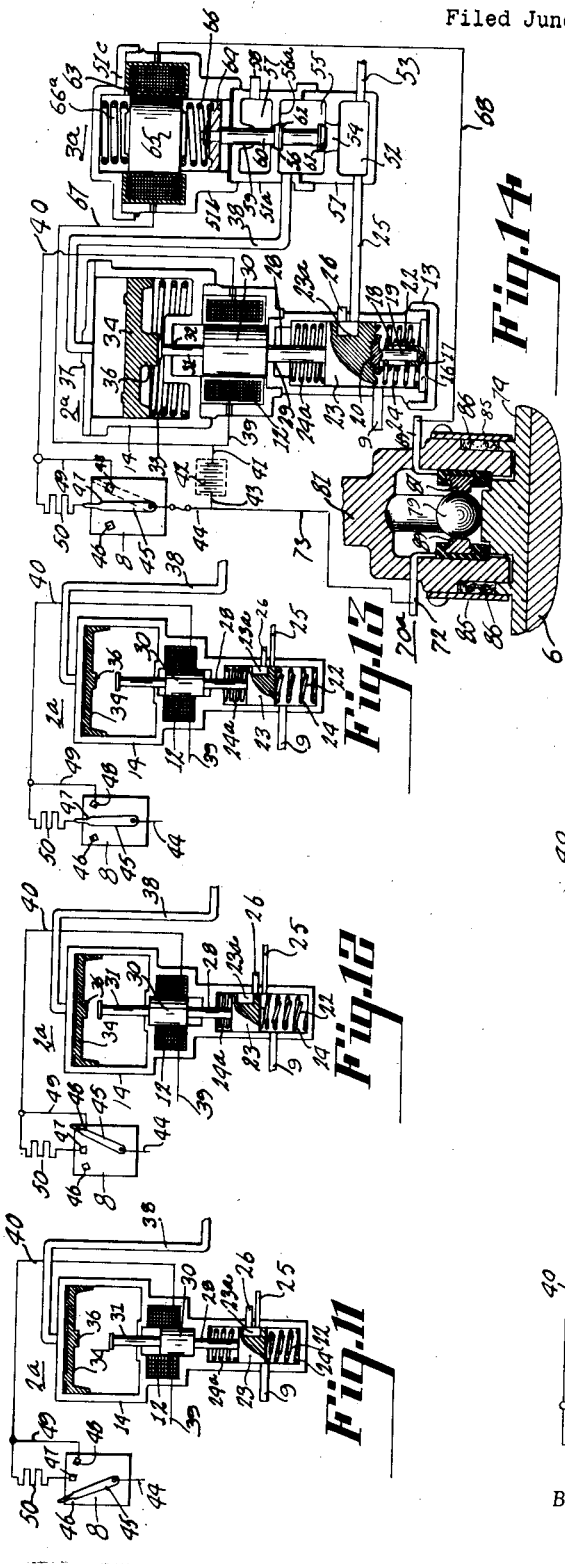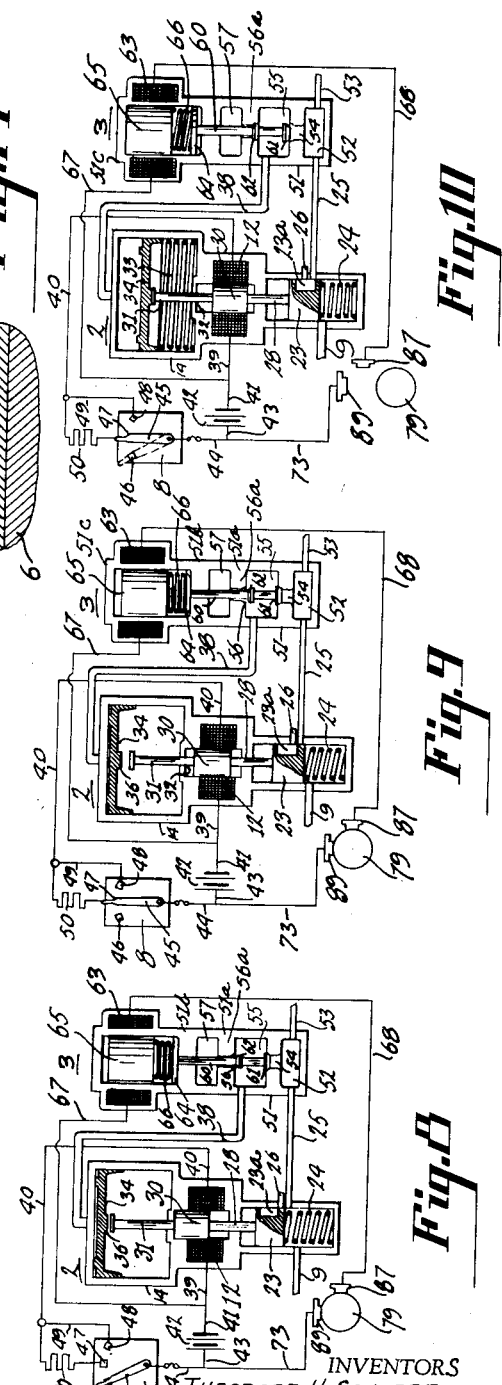

Patented June 14, 1938

2,120,443

UNITED STATES PATENT OFFICE 2,120,443

METHOD AND APPARATUS FOR BRAKING

Theodore H. Schoepf and David M. Ritchie, Cincinnati, Ohio, assignors to The Cincinnati Traction Building Company, Cincinnati, Ohio, a corporation of Ohio Application June 8, 1937, Serial No. 147,070

14 Claims. (Cl. 303—21)

This invention relates to a method and apparatus for braking.

It is an object of this invention to provide brake control means for preventing wheel locking during deceleration of a vehicle under the application of the wheel brakes thereof.

It is a further object of this invention to provide a method and mechanism for braking in such manner that locking of a wheel, during brake application, due to loss of traction, will automatically reduce the intensity of brake application on that wheel, whereby to prevent sliding or skidding of the wheel over its supporting surface.

It is a further object of this invention to provide a method of braking whereby to prevent loss of control of a vehicle due to locking of one or more of the wheels thereof during a brake application.

It is a further object of this invention to provide wheel speed responsive means for controlling the intensity of brake application to one or more of the wheels of the vehicle.

It is a further object of this invention to provide such means in the form of an inertia actuated wheel speed responsive switch mechanism adapted to control an operating circuit for electrically operated fluid valve control means.

It is a further object of this invention to provide such means which will automatically become operative upon reduction of the speed of a vehicle wheel below a predetermined value, automatically to reduce the intensity of brake application, either to that wheel or to all of the wheels of the vehicle.

It is a further object of this invention to provide such a method and means of brake control for an automotive vehicle as will relieve the operator from the exercise of judgment of rail or roadway surfaces in the application of the wheel brakes of the vehicle.

It is a further object of this invention to provide such a method and mechanism which is particularly adapted for rail vehicles provided with automatic fluid brake mechanism.

It is a further object of this invention to provide means for automatically releasing the fluid or other means utilized to effect braking of the wheels of a vehicle when the condition of the supporting trackway or roadway causes locking or skidding of the vehicle wheels thereon.

It is a further object of this invention to release the braking when the speed of a vehicle axle or wheel approaches or reaches such a value as to indicate locking of a wheel or axle, whereby to control the intensity of brake application through the speed of a vehicle wheel or axle.

These and other objects and advantages will appear from the following description taken in connection with the drawings.

In the drawings:

Figure 2 is an enlarged detail, partly in section, of structure illustrated in Figure 1, illustrating the position of parts when the vehicle axle is at rest;

Figure 3 is a fragmentary view similar to Figure 2, but showing the parts in the position assumed by them when the vehicle axle is traveling at a speed greater than a predetermined value;

Figure 4 is an elevational view, partly in section, of the structure shown in Figure 2;

Figure 5 is an enlarged view, in section, of the control valve means illustrated in Figure 1;

Figure 6 is a fragmentary section taken on the line 6—6 of Figure 2;

Figure 7 is a fragmentary section taken on the line 7—7 of Figure 3;

Figure 8 is a diagrammatic view of the control valve structure shown in Figure 1 in the position assumed by the parts for admission of fluid pressure to the fluid pressure braking system;

Figure 9 is a similar view, but illustrating the position assumed by the parts for retaining a predetermined pressure in the brake cylinder;

Figure 10 is a similar diagrammatic view illustrating the position assumed by the parts upon locking of a vehicle wheel when the control switch has been set either in the position of Figure 8 or in the position of Figure 9;

Figure 11 is a similar diagrammatic view of a modified form of electromagnetic fluid pressure admission valve, showing the position assumed by the parts when the brakes are released;

Figure 12 is a similar view of the valve illustrated in Figure 11, showing the position assumed by the parts for application of the fluid brakes;

Figure 1:
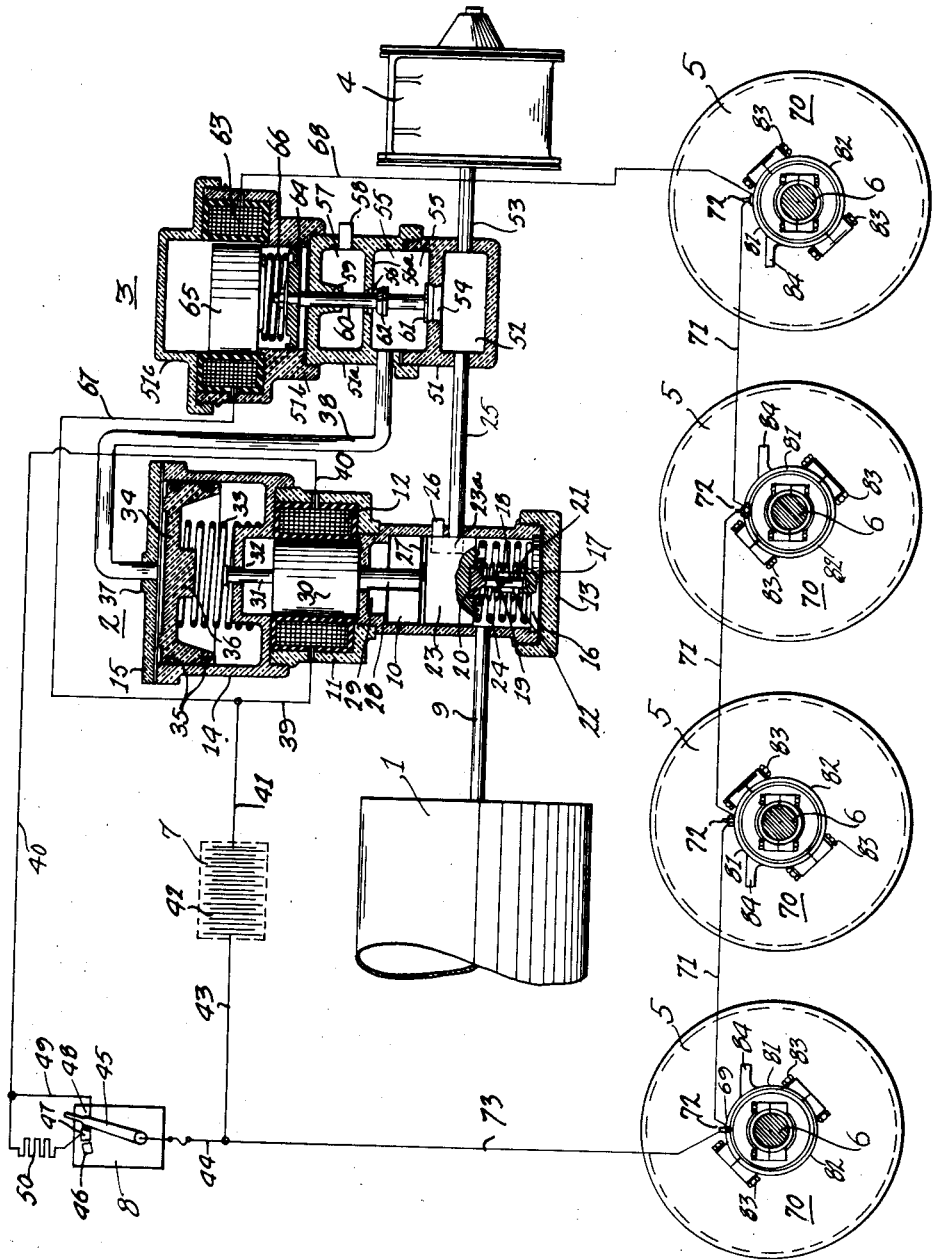
Figure 1 is a diagrammatic view, partly in section and partly broken away, of a preferred application of the principles of this invention to a railway vehicle braking system.

Figure 13 is a similar view of the valve illustrated in Figures 11 and 12, but showing the position assumed by the parts for retention of a predetermined fluid pressure in the vehicle brake cylinder; and Figure 14 is a diagrammatic view similar to Figure 1, showing details of the valve illustrated in Figures 11, 12 and 13, and illustrating the position assumed by the parts upon locking of a vehicle wheel to release the braking pressure.

The efficiency of braking achieved in operation of conventional wheel brakes, either of track vehicles or of automotive road traveling vehicles, is dependent, first, upon the coefficient of friction between the brake shoes and the cooperating surfaces of the wheels to which they are applied and, second, upon traction between the particular wheels and the supporting track rails or roadway. The traction between the vehicle wheels and the supporting surfaces is dependent upon the coefficient of friction between the wheels and the supporting surfaces.

The coefficient of friction between the respective wheels and the supporting surfaces varies, as is well known, due to weather conditions and according to the condition of the rail or roadway surfaces. As it is impossible to control the weather conditions, it is impossible fully to control the variation of traction between vehicle wheels and supporting rails or roadway surfaces due to variation of coefficient of friction caused by varying weather conditions. Generally, this variation in coefficient of friction is uniformly distributed between all wheels of a rail vehicle and/or train of such vehicles, but due to the non-uniform condition of roadway surfaces, the coefficient of friction between wheel and supporting surfaces often varies greatly as between the respective wheels.

For this reason, it is preferred by us that the braking pressure applied to each wheel of an automotive road vehicle be controlled independently of the braking of every other wheel of the vehicle, although this is generally unnecessary in the application of the principles of this invention to railway vehicles.

In the application of the principles of this invention to the conventional air brake equipment of a railway vehicle, we provide between the fluid pressure reservoir and the fluid pressure brake cylinder of the vehicle a lapping electromagnetically operated pressure admission valve having fluid connection with the reservoir and with an electromagnetically operated fluid pressure retaining valve, which latter valve is connected to the brake pressure cylinder and also to the pressure admission valve. The latter valve is provided with an energizing circuit, in which is disposed one or more inertia actuated wheel speed responsive circuit switch mechanisms, which is adapted to close the energizing circuit and maintain the pressure retaining valve energized at all times, while the wheel speed is above a predetermined amount, but which switch mechanism operates automatically upon reduction of the wheel speed below a predetermined amount to deenergize the pressure retaining valve, whereby to cause it to cooperate with the fluid pressure admission valve to release the pressure in the fluid brake cylinder in order to reduce the braking pressure and release the locked wheel, whereupon the circuit will again be completed to energize or close the pressure retaining valve.

The fluid pressure admission valve is normally energized and, when energized, prevents admission of fluid pressure to the brake cylinder, and an operating control mechanism is provided for normally closing the energizing circuit of the fluid pressure admission valve which is adapted to be operated to break the energizing circuit and cause the fluid pressure admission valve to admit pressure from the fluid reservoir to the brake cylinder under the control of the pressure retaining valve, and the operating control switch mechanism is also provided with a third or intermediate operative position wherein a partial energization of the fluid pressure admission valve may be achieved to retain, under the control of pressure retaining valve, a predetermined value of fluid pressure in the brake cylinder.

It is to be noted that the valves in this embodiment which is illustrated in Figures 1, 5, 8, 9 and 10, are both normally energized when the vehicle is in running position, and the brakes released (Figure 1). The pressure admission valve is de-energized to cause brake application (Figure 8), and/or partially energized to retain a predetermined pressure in the brake cylinder (Figures 5 and 9), in both of which cases, the pressure retaining valve will remain energized. In any of the above cases, the inertia actuated wheel speed responsive switch mechanism or mechanisms are in circuit closing position. If, however, the speed of one or more of the vehicle wheels falls below a predetermined value, the switch mechanism will automatically open (Figures 2, 4, 6 and 10) to energize the pressure retaining valve, as shown in Figure 10.

In controlling the brakes of automotive road vehicles, it is preferred that the modified forms of pressure admission valve, pressure retaining valve, and centrifugal switch mechanism, illustrated in Figures 11 to 14 inclusive, be substituted for that illustrated in Figures 1, 5 and 8 to 10 inclusive and described above. This modified form of pressure admission valve operates in substantially the same manner as the normally energized valve, save that it is normally de-energized, as shown in Figure 11, when the brakes are released, is fully energized as shown in Figure 12 to cause admission of fluid pressure to a brake cylinder, and partially energized, as illustrated in Figure 13, to retain a predetermined fluid pressure in the brake. As this valve is, of course, associated with the modified pressure retaining valve (Figure 14) in the same manner in which the normally energized pressure admission valve is connected to the normally energized pressure retaining valve, its action is, of course, dependent upon de-energization (for closing) of the modified pressure retaining valve shown in Figure 14. When the pressure retaining valve is energized upon reduction of wheel speed below a predetermined value, by operation of the modified form of centrifugal switch mechanism to complete the energizing circuit thereof, the parts will take the position illustrated in Figure 14, whereby to release the fluid pressure from the brakes.

In applying the structure shown in Figure 14 to an automotive road vehicle, it is, of course, to be understood that each wheel is preferably to be provided with inertia actuated wheel speed responsive switch means; and, while it is possible to connect each of these switches into a single pressure retaining valve energizing circuit as illustrated in Figure 1, it is preferred, for reasons explained above, that a separate pressure retaining valve be provided for each wheel brake and that a separate pressure admission valve also be provided for each wheel brake, all of which are to be controlled by a single control switch mechanism, as illustrated in Figure 14.

Referring to the drawings in detail and with reference particularly to Figure 1, the fluid pressure reservoir is designated 1, the fluid pressure inlet or admission valve is generally designated 2, the pressure retaining valve is generally designated 3, and the fluid pressure brake cylinder is designated 4. The wheels of a rail vehicle are designated 5 and are provided with axles designated 6. 7 designates any suitable source of power such as a storage battery or the like, while 8 generally designates the operating control switch.

The fluid pressure reservoir 1 is connected by means of a pipe 9 with the interior of the cylinder 10 of the inlet valve 2. Above the cylinder 10, the inlet valve is provided with a screw-threadedly secured cup-like casing member 11 having therein an electromagnetic solenoid coil 12. The lower end of the cylinder 10 is closed by the screw-threaded cap 13. Screw-threadedly secured to the top of the casing 11 is the lap cylinder 14 having its upper end closed by the cap member 15. Rigidly locked to the bottom of the cylinder 10 by means of the cap 13 is the pedestal member 16 having an upwardly extending stem 17 provided with a central vertical bore 18 which slidably receives the stem 19 of a plunger 20 having an enlarged disk-like head.

A transverse slot extends through the stem 17 for slidably guiding the cross pin 21 which extends transversely through the lower end of the plunger 20. A spring 22 is disposed about the stem 17 of the pedestal member 16 and has its lower end engaged with the pedestal member and its upper end engaged with the under side of the head of the plunger 20. The pedestal member and its resiliently supported plunger 20 form a resilient thrust mechanism for cooperation with a cylindrical valve member 23 which is reciprocable in the cylinder 10 and urged upwardly therein by a compression spring 24 having engagement with the lower end thereof and the upper end of the base of the pedestal 16.

The valve member 23 is provided at one side with a port 23a which is adapted to cooperate with an outlet aperture having connection with the pipe 25 which is connected to the lower cylinder of the pressure retaining valve 3, as hereinafter more clearly described, and with an aperture connected to the exhaust pipe 26. At its upper end, the valve member 23 is provided with a suitable piston ring 27 to prevent leakage, and the valve member 23 is connected by means of the valve stem 28, which extends through a central aperture 29 at the top of the cylinder 10, with the solenoid armature member 30 which reciprocates in the interior bore of the coil 12 and which has a plunger member 31 extending upwardly therefrom and provided at its upper end with an enlarged head.

The plunger member 31 extends through a suitable bore or aperture 32 provided in the lower wall of the lap cylinder 14. The interior portion of the lower wall of the lap cylinder 14 is preferably provided with an upwardly extending boss, about which extends a compression spring 33 having its lower end in engagement with the lower wall of the lap cylinder 14 and its upper end in engagement with a lap piston 34 which is reciprocable in the lap cylinder 14 and which is provided with suitable piston rings 35 to prevent leakage and which is skirted and provided with a downwardly extending central boss 36 adapted, upon downward reciprocation of the lap piston 34, to engage the head of the plunger 31 to thrust the plunger 31 and its integrally connected armature member 30, valve stem 28 and valve member 23 downwardly with respect to the casing of the valve 2.

The cap member 15 is provided with a central aperture 37, to which is connected the lap pipe 38 which leads to the intermediate chamber of the pressure retaining valve 3, which is hereinafter more clearly described. One terminal of the coil 12 has the wire 39 extending therefrom, while the wire 40 extends from the other terminal thereof. The wire 39 is connected to the wire 41 which also has connection with one terminal of the source of power 42. The other terminal of the source of power 42 has the wire 43 extending therefrom. The wire 43 is connected by the wire 44 with the switch lever 45 of the control switch 8. The control switch 8 is provided with three switch contacts adapted to cooperate with the lever 45. One contact 46 is the "dead" or brake-applying contact. The second or intermediate contact 47 is the "lap" or "holding" contact, and the third contact 48 is the "live" or "running" contact. The latter, "live" or "running" contact 48, is connected by the wire 49 directly to the wire 40. The intermediate "lap" or "holding" contact 47 is connected through resistance element 50 with the wire 40.

When the pressure retaining valve 3 is energized and the switch lever 45 is engaged with the "running" contact 48, as illustrated in Figure 1, the solenoid coil 12 is energized by a circuit extending from one terminal of the source of power 42 through wire 43, wire 44, lever 45, wire 49 and wire 40 to one terminal of the coil 12 and thence from the other terminal of the coil 12 through wire 39 and wire 41 to the opposite terminal of the source of power 42. The coil is then energized to ultimate intensity and the energization of the coil 12 reacts upon the solenoid armature member 30 to thrust this member with its rigid valve stem 28 and valve member 23 downwardly against upward force of spring 24 and resilient plunger 20 to the position illustrated in Figure 1, wherein the port 23a of the valve member 23 connects the pipe 25 with the exhaust pipe 26 and the valve member 23 prevents connection between the pipe 9 and the pipe 25. When this position is taken by the parts, communication is provided from the cylinder 4 through the exhaust pipe 26 to the atmosphere, whereby pressure is released entirely from the brake cylinder 4.

In order to cause application of the brakes, it is necessary that communication be provided between pipe 9 and pipe 25 to connect the fluid pressure reservoir 1 with the brake cylinder 4. In order to accomplish this, the switch lever 45 is removed from the contact 48 and placed upon the "dead" or brake applying contact 46, as illustrated in Figure 8. The parts will then assume the position shown in Figure 8, wherein the valve member 23 will move upwardly under the force of spring 24 and resilient plunger 20 to a position above the end of pipe 25, whereby the ends of pipes 9 and 25 communicate to permit fluid pressure to enter the brake cylinder 4. If, after pressure has started to flow, it is desired to check the further flow of fluid pressure and retain the fluid pressure introduced into the cylinder 4, the switch lever 45 is then moved from contact 46 to contact 47, as shown in Figure 9, to complete a circuit for energizing the coil 12 to an intensity less than the intensity of energization shown in Figure 1, because of the insertion of the resistance 50 in the energizing circuit. This places the valve member 23 in such position as to block the end of pipe 25, whereby to prevent escape of fluid pressure from the cylinder 4 (so long as valve 3 remains energized), also the valve member 23 blocks the end of the pipe 25 from the end of pipe 9 to prevent the further flow of fluid pressure from the reservoir 1 (Fig. 9).

The casing of the pressure retaining valve 3 comprises four superposed and screw-threadedly attached members 51, 51a, 51b and 51c. The lower member 51 forms the lower chamber 52 of the pressure retaining valve, to which is connected the pipe 25 leading to the cylinder 10 of the valve 2 and also the pipe 53 which is connected to the brake cylinder 4. At the top of the chamber 52 is a valve port 54 provided with a seat cooperating with a valve member, hereinafter more clearly described. The upper portion of the member 51 and the lower portion of the member 51a form the intermediate chamber 55 of the pressure retaining valve, to which chamber 55, the lap pipe 38 is connected. At the top of the chamber 55 and formed integrally with the member 51a is the wall 56a which is provided with a central valve port 56 having a suitable seat at its lower end for cooperation with the above-mentioned valve member.

The wall 56a forms, with the upper end of the member 51a, the upper chamber 57 having the exhaust pipe 58 leading therefrom. The upper end of the member 51a is provided with a central bore 59 surrounded by a bearing boss, which bore slidably receives the valve stem 60 which extends therethrough and which is provided at its lower end with a valve member 61 adapted to cooperate with the seat of the valve port 54 and also having thereon a second valve member 62 adapted to cooperate with the seat of the port 56. The member 51b is provided with an outer annular chamber in which is supported the solenoid coil 63 which is rigidly secured in this chamber by the member 51c which forms the cap of the casing and which is, as above described, screw-threaded to the member 51b. The member 51b and the member 51c have aligned central bores, and the bore in the member 51b slidably receives the disk 64 which is rigidly secured at the top of the valve stem 60. The bore in the member 51c and the upper portion of the bore in the member 51b, along with the central cylindrical aperture in the coil 63, receive the solenoid armature member 65 which is separated from the disk 64 by the compression spring 66 which is disposed therebetween.

When the coil 63 is energized, the armature member 65 is retained in the position shown in Figures 1, 5, 8 and 9 in stationary manner, whereby the downward thrust of the compression spring 66 acting through disk 64 and valve stem 60 retain the valve member 61 in engagement with the seat of the port 54 to retain pressure in the lower chamber 52 of the valve 3, which chamber communicates through pipe 53 with brake cylinder 4 and through pipe 25 with the valve 2, as above described.

Upon the de-energization of the solenoid coil 63, the solenoid armature member 65 is permitted to move upwardly to engagement with the central bore in the member 51c, whereby to release the pressure of the compression spring 66 and permit the valve stem 60 to move upwardly (where, and so long as, pressure in chamber 52 exceeds a predetermined safe braking pressure value) until the valve member 62 closes the port 56. When the valve member 61 is engaged with the seat of port 54, communication is prevented between lower chamber 52 and intermediate chamber 55 of valve 3, while communication is provided from brake cylinder 4 through pipe 53 and lower chamber 52 to the pipe 25. Communication is also provided from the top of lap cylinder 14 through lap pipe 38, intermediate chamber 55, port 56 and upper chamber 57 to the exhaust pipe 58. When the valve member 61 is disengaged from the seat of port 54 and the valve member 62 engaged with the seat of port 56, communication between intermediate chamber 55 and upper chamber 57 is prevented, while the intermediate and lower chambers 55 and 52 respectively are connected by the open port 54 in such manner that fluid pressure from cylinder 4 may pass through port 54, intermediate chamber 55 and lap pipe 38 to the upper part of lap cylinder 14, whereby to thrust the lap piston 34 downwardly against the force of spring 33. Communication between lower chamber 52 and the exhaust pipe 26, as well as the supply pipe 53 extending to reservoir 1, is, as above described, controlled by the valve member 23.

One terminal of the coil 63 is connected by wire 67 to the wire 41 which leads to one terminal of the source of power 42, as explained above. The other terminal of the coil 63 is connected by the wire 68 to the terminal 69 of a centrifugal or inertia actuated wheel speed responsive switch mechanism, generally designated 70. Four of these switch mechanisms 70 are shown in Figure 1, all connected in series by the wires 71. The first wire 71 leads from the terminal 72 of the switch mechanism having its terminal 69 connected to the wire 68 to the terminal 69 of the next switch mechanism which has its terminal 72 connected by the second wire 71 to the terminal 69 of the third switch mechanism, which third switch mechanism has its terminal 72 connected by the third wire 71 to the terminal 69 of the fourth switch mechanism 70. The fourth switch mechanism 70 has its terminal 72 connected by wire 73 to the wire 43 which leads to that terminal of the source of power 42, opposite the terminal to which the wire 41 is connected. When all of the switch mechanisms 70 are closed, a circuit extends from one terminal of the source of power 42 through wire 41 and wire 67 to one terminal of the coil 63 and thence from the opposite terminal of the coil 63 through wire 68, through the first switch mechanism, through the succeeding switch mechanisms and their connecting wires 71 through wire 73 and wire 43 to the source of power 42. The coil 63 will then be energized to retain the parts in the position illustrated in Figure 1. This energization of the coil 63 is dependent upon all of the switch mechanisms 70 remaining closed. Upon the opening of any of the switch mechanisms 70, the coil 63 will be de-energized to open the port 54 and close the port 56 of valve 3, as described above (see Fig. 10).

The details of the centrifugal switch mechanisms 70 are illustrated in Figures 2, 3, 4, 6 and 7. As shown, these switch mechanisms are applied to each of the four axles of a railway vehicle, but it is, of course, to be understood that they are susceptible of application to the separate wheels of an automotive road vehicle having four or more wheels.

As seen in Figures 2, 3, 4, 6 and 7, the rotor of the centrifugal wheel responsive switch mechanism comprises a pair of semi-annular sleeve members 74 suitably provided with flanges to receive the connecting bolts 75 which secure them rigidly together and to the axle 6. Secured to the rotor comprised by the complementary connected sleeve members 74 is one or more bifurcated bracket members 76 having a pivot pin 77 extending transversely therethrough, upon which is pivoted a switch arm 78 having a substantially spherical weighted head member 79 at one end. The opposite end of the switch arm 78 is provided with a flattened portion adapted to be engaged by one end of a compression spring 80 disposed between this portion of the switch arm 78 and the bracket 76. The springs 80 normally urge the switch arms 78 inwardly against the centrifugal force exerted thereon.

The stationary casing of the switch device comprises a pair of complementary annular members 81 and 82 which are secured together by means of bolts 83. The member 81 is provided with a flange or bracket 84, by means of which it may be secured to any stationary part of the vehicle truck. The members 74 are provided with suitable flanges 74a which are adapted to be engaged, as shown in Figure 4, by the sides of the members 81 and 82 and suitable annular or semi-annular plates 85 are rigidly secured at each side of the stationary casing, and suitable packing 86 is provided for sealing the interior of the casing for protective purposes.

Disposed on one side wall of the casing is an annular contact rail 87 which is provided with a suitable insulating support 88 secured to the side wall of the casing. A second annular conducting rail 89 provided with a suitable insulating support 90 is secured to the outer wall of the casing. The rail 89 is electrically connected to the terminal 72 of the switch, which terminal is insulated from the casing, as shown in Figure 4. The terminal 69 has electrical connection with the rail 87. When the speed of rotation of the axle 6 is below a predetermined value, the force of the spring 80 will be sufficient to retain each arm 78 inwardly or in the position shown in Figures 2, 4 and 6. When, however, the speed of rotation of the axle 6 is above a predetermined value, the centrifugal force exerted by the weight of the head member 79 will cause the force of spring 80 to be overcome, whereby the arm will be swung outwardly to the position shown in Figures 3 and 7, whereby to place the head 79 of each arm in engagement with both rails 87 and 89.

When the head 79 engages the respective rails 87 and 89, a circuit is completed therebetween, and, when the axle speed falls below a predetermined amount, the heads 79 are disengaged from the respective rails 87 and 89 and at that time the circuit will be broken. Therefore, when the axle 6 is rotating at a speed above a predetermined value, the electric circuit for energizing the coil 63 of the valve 3 will be complete, and, upon locking of the axle 6, with which the switch arms 78 rotate, the spring 80 will become operative to remove the heads 79 of the switch arms 78 from engagement with the respective rails 87 and 89 and break the circuit extending therebetween, at which time the coil 63 of the valve 3 will be de-energized to permit the port 54 to be opened and the port 56 to be closed (so long as pressure in chamber 52 is above a predetermined safe value), as shown in Figure 10.

*Operation*

The running position of parts is shown in Figure 1 and, as shown therein, inlet valve 2 and pressure retaining valve 3 are energized, the centrifugal switches 70 are closed and valve member 23 is in such position as to prevent pressure from reservoir 1 from reaching pipe 25 and also for providing communication between brake cylinder 4 and the atmosphere through port 23a and exhaust pipe 26. In order to apply the brakes, the switch lever 45 is placed in engagement with the contact 46 of switch 8, as shown in Figure 8, and de-energization of coil 12 of valve 2 permits plunger 20 and spring 24 to thrust valve member 23 upwardly to the position of Figure 8, whereby to provide communication from pipe 9 to pipe 25, thereby introducing fluid pressure from reservoir 1 to brake cylinder 4. If it is desired to prevent further flow of fluid pressure, the switch lever 45 is engaged with contact 47 of switch 8, whereby to partially energize coil 12 due to insertion of resistance element 50 in the energizing circuit thereof. The parts then take the position shown in Figure 9, wherein valve member 23 blocks the end of pipe 25 to prevent further flow of fluid pressure from pipe 9. In all of the positions illustrated in Figures 1, 8 and 9, the centrifugal switches 70 were closed, as shown in those figures, due to the wheel speed of the vehicle, which was sufficient to place the members 79 of the switches in engagement, each with its corresponding rails 87 and 89, whereby to complete the circuit therebetween.

When the wheel is locked or the wheel speed reduced to such degree as to permit springs 80 to withdraw members 79 from their cooperating rails 87 and 89, the circuit through the centrifugal switches is broken, as diagrammatically illustrated in Figure 10. This de-energizes the coil 63 of the pressure retaining valve 3. The pressure of spring 66 of the valve 3 is still sufficient to seat the valve member 61 to prevent flow of pressure from the chamber 52 so long as fluid pressure in the chamber 52 and in the brake cylinder 4 is below a predetermined safe braking pressure. This pressure is dependent upon the strength of spring 66 and the spring 66 is, therefore, so chosen as to provide for such operating characteristics as will retain fluid pressure below a predetermined safe amount in the chamber 52. This prevents the total loss of pressure in the chamber 52 and brake cylinder 4, because the valve member 61 will be seated immediately upon the fluid pressure in the chamber 52 falling below this predetermined safe value. The apparatus is preferably so adjusted that this "safe" braking pressure may be such as to be insufficient to overcome the co-efficient of friction between wheel and supporting surface during brake application.

When the pressure in the chamber 52 is greater than the predetermined safe value, the valve member 61 will be unseated to open port 54 and close port 56, whereby fluid pressure from the chamber 52 will be introduced into the lap cylinder to thrust piston 34 downwardly into engagement with stem 31 of the valve 2. The valve 2 will then lap, the valve member 23 being reciprocated to relieve pressure in the chamber 52. When this pressure is reduced to the predetermined safe value, the valve member 61 will again be seated to close port 54 and meanwhile the axle which was hitherto locked will have regained sufficient speed to again close the opened centrifugal switch to complete the energizing circuit of coil 63 of valve 3, whereupon the parts will return to the position of Figure 8 or Figure 9.

*Modified structures—(Figs. 11–14)*

For application to vehicles, wherein it is undesirable that live energizing circuits be normally maintained, we have provided a modified form of fluid pressure inlet or admission valve designated 2a and a modified form of pressure retaining valve 3a as well as a modified form of centrifugal switch mechanism, designated 70a. The construction of the valve 2a is the same as that of the valve 2, save for re-location of the armature member 30 with respect to the energizing coil 12 and the addition of the compression spring 24a in opposition to the compression spring 24 in the top of the cylinder 10 above the valve member 23.

The running position of this valve is illustrated in Figure 11, and it will be seen that the "dead" contact 46 of the switch 8 has become the running contact, while the contact 47 remains the pressure retaining contact and the contact 48 becomes the braking or application contact. As shown in Figure 11, when the switch lever 45 is engaged with the contact 46, the solenoid coil 12 is de-energized and the spring 24a, acting against the spring plunger 20 and spring 24, retains the valve member 23 in its lowermost position, whereby to prevent admission of fluid pressure from pipe 9 to pipe 25, while at the same time connecting pipes 25 and 26, as shown in Figure 11.

When it is desired to apply the brakes, the switch lever 45 is engaged with the contact 48 of the switch 8, whereby to fully energize the solenoid coil 12 and draw the armature member 30 upwardly to compress the spring 24a, as shown in Figure 12, to connect pipes 9 and 25. When it is desired to retain the fluid pressure in the pipe 25, chamber 52, pipe 53, and cylinder 4, the switch lever 45 is engaged with the intermediate contact 47, as shown in Figure 13, whereby to partially compress spring 24a by reason of the partial energization of solenoid coil 12, whereby the valve member 23 is placed in the position of Figure 13 to block the end of pipe 25.

The valve 3a, as shown in Figure 14, is of similar construction to the valve 3, save for the addition of the spring 66a above armature member 65. The strengths of springs 66a and 66 are so chosen that, when the coil 63 is de-energized, the valve member 61 will be retained on its seat by the combined forces of springs 66 and 66a, while, when the coil 63 is energized, the upward force applied to armature member 65 will compress spring 66a and thus relieve the disk 64 of the downward force of the spring 66a. When the coil 63 is thus energized, as seen in Figure 14, any value of fluid pressure in the chamber 52 of valve 3a above the predetermined safe value will cause the valve member 61 to be unseated whereby to close port 56 and provide communication through port 54 from chamber 52 to pipe 38.

When the valve 2a and valve 3a are utilized in controlling the braking pressure, it is necessary to control the energization of the coil 63 of valve 3a by a modified form of centrifugal switch mechanism 70a, as shown in Figure 14. The structure of the switch mechanism 70a is similar to that of the switch mechanism 70, save that the rail 89 is placed opposite the rail 87 at the side of the switch mechanism casing, as shown in Figure 14, in such manner that the member 79 will be in engagement with the rails 87 and 89 when the speed of rotation of member 74 is below a predetermined value and, when the speed of rotation of this member is above the predetermined value, the member 79 will be spaced radially outwardly of the rails 87 and 89 in such manner as to open the circuit between the rails 87 and 89.

*Operation of modified structure*

The operation of the structure of Figures 11 to 14 inclusive is the same as that of the unmodified structure described above. The running position of the valve 2a is shown in Figure 12, the braking or application position is shown in Figure 12, and the pressure retaining or holding position is illustrated in Figure 13; while, as illustrated in Figure 14, when the switch arm 45 is in engagement either with contact 47 or with contact 48, reduction of the speed of rotation of the member 74 below a predetermined value will cause the member 79 to swing radially inwardly to engage rails 87 and 89 and complete the energizing circuit for the coil 63 of the valve 3a, whereby to relieve the downward pressure on the valve member 61 so that this valve member may be unseated when, and so long as, the fluid pressure in the brake cylinder and in the chamber 52 remains above a predetermined safe value.

While this latter or modified structure may be applied to railway vehicles, it is also suitable for use in automotive road vehicles, in which case each wheel brake will be provided with a separate inlet valve, 2a, pressure retaining valve 3a, and switch mechanism 70a and the pipe 53 of each valve 3a will be connected to the diaphragm or cylinder of the fluid brake of the wheel, while the pipe 9 will be connected to any suitable source of fluid pressure and a single control switch 8 and source of electric power 42 will be used for controlling the valves.

It is further to be understood that the safety automatic features of this invention may be applied to any type of equipment now in operation to provide the maximum braking power and prevent locking or skidding of the wheels thereof; in the case of the application of this structure to the fluid pressure brake systems of such rail vehicles, the solenoid control feature of the inlet valve 2a may, where preferable, be omitted.

It will be understood that the above described structure is merely illustrative of the manner in which the principles of our invention may be utilized and that we desire to comprehend within our invention such modifications as come within the scope of the claims and the invention.

Having thus fully described our invention, what we claim as new and desire to secure by Letters Patent is:

1. In brake control means for vehicles having fluid pressure wheel brakes, electromagnetic inlet valve means selectively electrically operable for supplying fluid pressure to apply said brakes, for retaining fluid pressure in said brakes, or for releasing fluid pressure therefrom, pressure retaining valve means for retaining fluid pressure in said brakes or for causing fluid pressure operation of said inlet valve to release fluid pressure from said brakes, and wheel speed responsive means for controlling said last-named pressure retaining valve means to maintain the braking force insufficient to destroy wheel traction.

2. In brake control means for vehicles having fluid pressure wheel brakes, electromagnetic inlet valve means for supplying fluid pressure to said brakes, an energizing circuit for said inlet valve means, manual selectively operable control switch means in said circuit for operating said inlet valve means for supplying, releasing, or retaining fluid pressure in said brakes, valve means for retaining fluid pressure in said brakes, an operating fluid connection between said valve means, and centrifugal wheel speed responsive means for controlling said last-named valve means for operating said inlet valve means through said operating fluid connection.

3. In brake control means for vehicles having fluid pressure wheel brakes, inlet valve means manually operable to supply fluid pressure to said brakes and fluid pressure operative to release it therefrom, electromagnetic pressure retaining valve means having an operative fluid connection with said inlet valve means, and centrifugal wheel speed responsive switch means for controlling said last-named pressure retaining valve means for operation of said inlet valve means through said fluid connection upon occurrence of wheel locking.

4. In brake control means for vehicles having fluid pressure wheel brakes, electromagnetic inlet valve means manually operable for supplying fluid pressure to said brakes, releasing fluid pressure therefrom, and retaining pressure therein, and fluid operable to release fluid pressure therefrom, electromagnetic pressure retaining valve means having operating fluid connection with said inlet valve means for operation thereof to release fluid pressure from said brakes, and wheel speed responsive switch means for controlling said inlet valve means through energization of said pressure retaining valve means.

5. In vehicle brake control means, fluid pressure braking means, means to supply fluid pressure to said braking means and to maintain the braking fluid pressure at a value insufficient to cause loss of wheel traction, said means including an electromagnetic pressure retaining valve having connection with said braking means and operative when energized to retain fluid pressure therein, an energizing circuit for said valve, wheel speed responsive switch means in said circuit operative upon reduction of wheel speed below a predetermined value to open said circuit to de-energize said valve, an inlet valve having connection with said braking means through said retaining valve, said valve being manually selectively operable for supplying fluid pressure, retaining fluid pressure, or releasing fluid pressure from said braking means and fluid operable to release fluid pressure therefrom, and a fluid operating connection from said retaining valve to said inlet valve for operation of said inlet valve upon de-energization of said retaining valve to release fluid pressure from said braking means.

6. In vehicle brake control means, fluid pressure braking means, means to supply fluid pressure to said braking means and automatically operable upon loss of wheel traction to reduce the braking fluid pressure to a value permitting restoration of wheel traction, said means including an electromagnetic pressure retaining valve having connection with said braking means and normally operative when de-energized to retain fluid pressure therein, an energizing circuit for said valve, wheel speed responsive switch means in said circuit operative upon reduction of wheel speed below a predetermined value to close said circuit to energize said valve, an inlet valve having connection with said braking means through said retaining valve, said valve being manually selectively operable for supplying fluid pressure, retaining fluid pressure, or releasing fluid pressure from said braking means, and fluid operable to release fluid pressure therefrom, and a fluid operating connection from said retaining valve to said inlet valve for operation of said inlet valve upon energization of said retaining valve to release fluid pressure from said braking means.

7. In vehicle brake control means, fluid pressure braking means, means to supply fluid pressure to said braking means including an electromagnetic inlet valve selectively manually electrically operable for supplying fluid pressure to said braking means, retaining fluid pressure therein or releasing pressure therefrom and operable by fluid pressure for releasing fluid pressure therefrom, and means responsive to vehicle wheel speed to reduce the braking fluid pressure to a value insufficient to overcome the co-efficient of wheel friction, immediately upon occurrence of wheel skidding by fluid pressure operation of said inlet valve.

8. In vehicle brake control means, fluid pressure braking means, electromagnetic fluid pressure retaining valve means to retain fluid pressure in said braking means, electromagnetic fluid pressure supply valve means to supply fluid pressure through said pressure retaining valve means to said braking means, an operating fluid connection between said valve means, and wheel speed responsive means operable automatically upon destruction of wheel traction to operate said pressure retaining valve means to cause operation of said supply valve means through said operating fluid connection to reduce the braking pressure.

9. In vehicle brake control means, fluid pressure braking means, means to supply fluid pressure to said braking means including an electromagnetic valve, an energizing circuit therefor, and a manual switch for controlling said circuit, electromagnetic valve means to retain the fluid pressure in said braking means when energized, an energizing circuit therefor, and plural axle speed responsive centrifugal switch means connected in series in said last-named circuit and operable upon destruction of wheel traction automatically to operate said pressure retaining valve means to reduce the braking pressure.

10. In vehicle brake control means, fluid pressure braking means, electromagnetic valve means to supply fluid pressure to said braking means, an energizing circuit for said valve, normally closed electromagnetically operable means to retain the fluid pressure in said braking means, wheel speed responsive centrifugal switch means automatically operable upon destruction of wheel traction to open said fluid pressure retaining valve means to reduce the braking pressure, and a control switch in the supply valve energizing circuit selectively manually operable, when said fluid pressure retaining means is closed to supply fluid pressure to said braking means, to retain it therein or to release it therefrom.

11. In vehicle brake control means, fluid pressure braking means, fluid pressure supply means including a manually controllable electromagnetic fluid pressure supply valve for applying said braking means, and means automatically operable upon loss of wheel traction to cause reduction of braking pressure, said last-named means including an electromagnetic pressure retaining valve energizable for maintaining application of said braking means, an energizing circuit for said valve, and a plurality of axle speed responsive switch devices in series in said circuit.

12. In brake control means, an electromagnetic fluid pressure retaining valve, an energizing circuit therefor, and a plurality of axle supported centrifugal switch means connected in series in said energizing circuit for controlling said valve means.

13. In brake control means for a rail vehicle having axles with wheels thereon, an electromagnetic fluid pressure retaining valve, an energizing circuit therefor, and a centrifugal wheel speed responsive switch means operatively connected to each axle and electrically connected in series in said energizing circuit for controlling said valve means.

14. In fluid pressure brake control means, a fluid pressure supply, an electromagnetic fluid pressure supply valve, manual means for operating said supply valve, a pressure retaining valve associated with said supply valve, a brake cylinder having connection through said pressure retaining valve to said electromagnetic fluid pressure supply valve, and wheel speed responsive means for controlling said pressure retaining valve.

THEODORE H. SCHOEPF.
DAVID M. RITCHIE.

DISCLAIMER 2,120,443.—*Theodore H. Schoepf* and *David M. Ritchie*, Cincinnati, Ohio. METHOD AND APPARATUS FOR BRAKING. Patent dated June 14, 1938. Disclaimer filed March 21, 1940, by the assignee, *The Westinghouse Air Brake Company*.
Hereby enters this disclaimer to claim 10 of said patent.
[*Official Gazette April 9, 1940.*]